United States Patent [19]

Cancio et al.

[11] Patent Number: 4,626,574
[45] Date of Patent: Dec. 2, 1986

[54] LINEAR LOW DENSITY POLYETHYLENE FILM AND METHOD OF MAKING

[75] Inventors: Leopoldo V. Cancio; James N. Fitzsimmons, both of Cincinnati; Robert M. Mortellite, Hamilton; Pai-Chuan Wu, Cincinnati, all of Ohio

[73] Assignee: Clopay Corporation, Cincinnati, Ohio

[21] Appl. No.: 699,745

[22] Filed: Feb. 8, 1985

Related U.S. Application Data

[62] Division of Ser. No. 400,416, Jul. 21, 1982.

[51] Int. Cl.⁴ .............................................. C08L 23/04
[52] U.S. Cl. ................................. 525/240; 425/72 R; 425/224; 425/385; 425/DIG. 55
[58] Field of Search ................. 428/210.3, 210.2, 216, 428/212, 213, 284, 516; 425/72 R, 224, 385, DIG. 55; 525/240

[56] References Cited

U.S. PATENT DOCUMENTS

| | | | |
|---|---|---|---|
| 4,339,507 | 7/1982 | Kurtz et al. | 428/522 |
| 4,394,474 | 7/1983 | McKinney et al. | 524/232 |
| 4,486,377 | 12/1984 | Lucchesi et al. | 264/212 |

Primary Examiner—Edith Buffalow
Attorney, Agent, or Firm—Wood, Herron & Evans

[57] ABSTRACT

A method for producing a linear low density polyethylene (LLDPE) film by slot-die extrusion from an extrudate having an inherent draw resonance tendency whereby draw resonance is eliminated in the production of film at high speeds. Film of commercially uniform gauge thickness is obtained having significantly improved strength over films formed by conventional slot-die extrusion of LLDPE.

6 Claims, 4 Drawing Figures

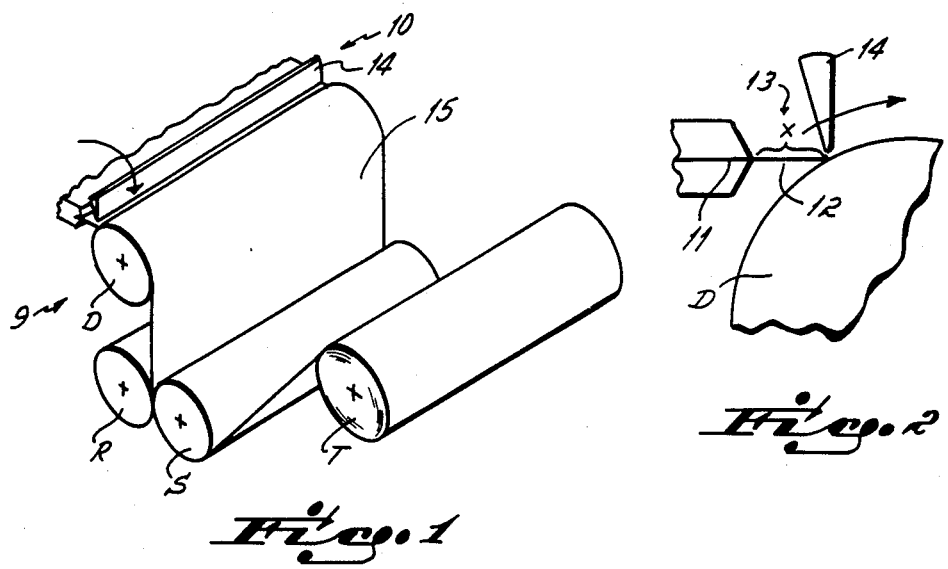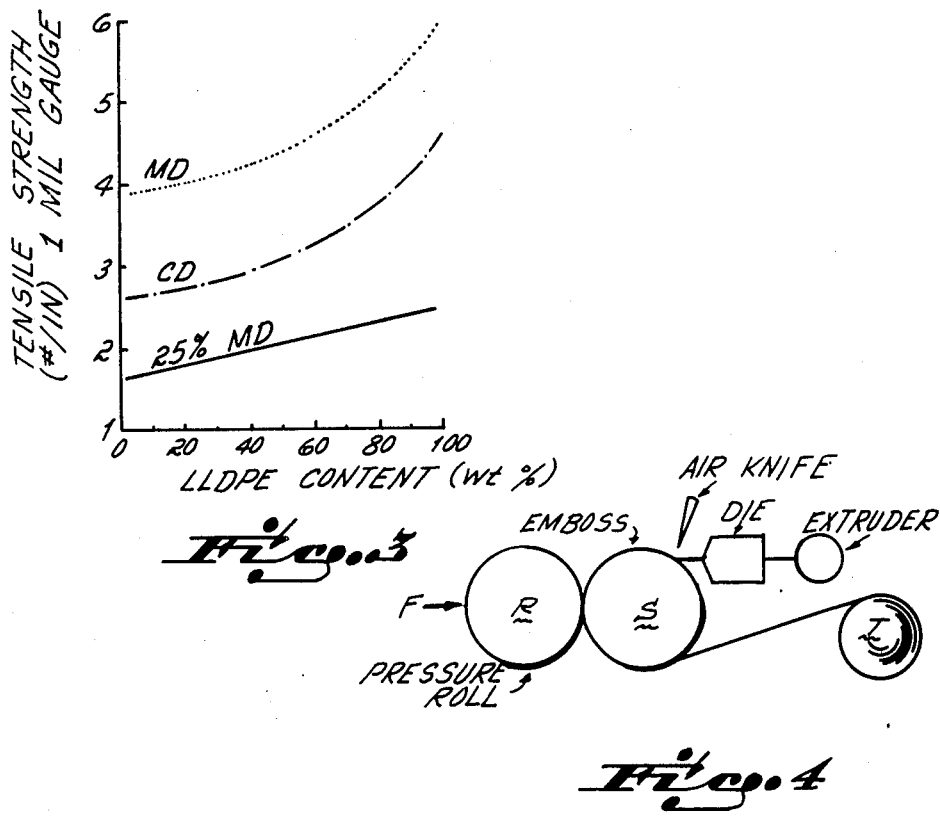

LINEAR LOW DENSITY POLYETHYLENE FILM AND METHOD OF MAKING

This is a division, of application Ser. No. 400,416, filed July 21, 1982.

BACKGROUND OF THE INVENTION

Thermoplastic film or sheet material has achieved widespread use in the fabrication of many useful articles. Particular utility for thermoplastic film has been found in the area of covering materials, such as diaper film and operating room table covers, due to the moisture barrier character of the plastic film, among other properties. Thin film of this type is typically produced by extrusion, the two general methods of extruding film being blown tubing and slot-die extrusion.

In the slot-die method of producing thermoplastic film, the heated plastic extrudate or melt, typically composed of polyethylene, polypropylene, and copolymers thereof, is extruded out of a narrow slot in an elongated die. Flat film is generally made in considerable widths on relatively large machines which run at high production rates on the order of 300 to 1000 or more feet-per-minute. The hot extrudate extruded in the form of a web from the slot-die is drawn and stretched through an air-gap to the desired gauge thickness and width by stretching rollers which form a nip for this purpose. The nipping rollers may also serve as an embossing or calendering means for the film if particular textures or surface characteristics and properties are desired for the film. The film then typically passes from the nipping rollers to a chill roller where it is cooled and set, and then to a take-up roller.

It has been known to use linear low density polyethylene as the polymer composition in the slot-die extrusion of film. The densities of this polymer have varied usually between about 0.915–0.940 g/cm$^3$. Linear low density polyethylene (herein simply sometimes LLDPE) as the term is used in this description is polyethylene having little or no long chain branching, with short chain branching in an amount necessary to obtain the desired density, currently for instance less than about 0.940 g/cm$^3$. For example, a common density for LLDPE used in diaper film is 0.926 g/cm$^3$, and for operating room table covers is 0.918 g/cm$^3$. Linear low density polyethylene has been considered desirable in that it exhibits a good balance of mechanical properties in film form, particularly ultimate tensile strength, impact resistance, burst strength and tear strength characteristics.

A serious drawback to the use of LLDPE is its susceptibility to draw resonance at a relatively low draw or take-up rate, typically at a take-up rate of about 40 feet per minute or more. Draw resonance is a phenomenon associated with stretching motions and it is manifested in the occurrence of periodic fluctuations in the thickness of the extrudate as it is drawn. Draw resonance is primarily a function of the take-up rate as well as the draw ratio, the draw ratio being the ratio of the die-slot width to the film thickness. In regard to the latter, for a given linear low density polyethylene extrudate, draw resonance is expected to be more severe in drawing a thinner gauge of the film, and its onset at a lower draw speed, than in a thicker gauge film.

Film exhibiting draw resonance can have gauge thickness variations on the order of ±5%, or more, which is considered to be commercially unsatisfactory. Such gauge variations deteriorate product uniformity and reduce the reliability and saleability of the film. As a consequence, LLDPE which has been produced by conventional slot-die extrusion techniques has been drawn at take-up rates less than the critical point at which draw resonance sets in which is usually about a production speed of 30 to 40 feet-per-minute. This is a factor which seriously limits productivity.

There is consequently a need in the industry for a method for producing LLDPE film by slot-die extrusion techniques at relatively high draw rates with substantial elimination of draw resonance in the extrudate to thereby yield a thermoplastic film which is uniform in gauge thickness within the range of commercial acceptability.

SUMMARY OF THE INVENTION

It is a principal object of this invention to produce a uniform thermoplastic film using linear low density polyethylene drawn at take-up rates greater than 40 feet-per-minute, the point at which draw resonance typically occurs with conventional slot-die extrusion machinery. Particularly, it is an object of this invention to produce such a film at very high take-up speeds on the order of several hundred feet-per-minute, or more, without the onset of draw resonance in the drawn extrudate.

To these ends, it has been discovered that substantial elimination of draw resonance in LLDPE extrudate can be achieved through reduction of the draw-gap between the die-slot and the drawing roller or rollers. In particular, it has been found that a draw-gap of about zero to not more than about six inches between the slot of the extrusion die and the draw roller enables LLDPE film to be drawn at speeds of several hundred feet-per-minute with gauge variations well within commercial tolerances for uniformity.

Furthermore, surprisingly it has been discovered that the LLDPE film produced by the method of this invention is stronger by significant orders of magnitude in both the machine direction and cross direction. These findings and other advantages of this invention will be further understood in view of the following description.

In preferred form embodying the principles of this invention, a conventional slot-die extrusion apparatus for production of diaper film is adapted to provide a draw-gap between about zero and about six inches, for example, one inch. A first roller in cooperation with an air-knife, serves to draw the extrudate into the desired gauge thickness and width. The LLDPE extrudate is extruded at a temperature above its crytallization temperature. The distance between the slot of the die (herein simply sometimes die-slot) and the first roller is the critical draw-gap. In the preferred form with an air-knife, the gap is the distance between the slot and the nip formed by the roller and the air-knife acting on the LLDPE web. The draw roller is either operated without the application of heat or at an elevated temperature, particularly for purposes of subsequent embossing. The draw roller is preferably coated with a polytetrafluoroethylene for better film release characteristics. At the draw roller, the LLDPE crystallizes and it has been found that the short draw-gap provides the benefits of this invention.

After the draw roller, the film may be introduced into a nip formed by an embossing roller which cooperates with a rubber roller to form an embossing system for embossing the surface of the film to a desired texture. A chill roll is thereafter employed to cool and set the film after it has passed through the embossing roller system, with the film ultimately being wound on a take-up roll. Thus, according to this invention, LLDPE extrudate is heated to a temperature above its crystallization temperature and extruded through the slot-die. Immediately upon introduction into the short gap maintained between the slot-die and the draw nip, the LLDPE is caused to be drawn to the desired gauge thickness and width film. Using this short-draw technique, 100% LLDPE film of 32 inches in width and a gauge thickness of 1 mil has been drawn as fast as 570 f.p.m. with only nominal variation on gauge thickness. For commercial applications, any take-up rate of about 300 f.p.m., or more, is considered very acceptable.

Although the instant invention solves the problem of draw resonance in slot-die extrusion of LLDPE films drawn at high take-up rates, a precise understanding of why the shortdraw technique is so effective is not yet available. The elimination of draw resonance by a short-draw zone is quite unexpected. One would logically expect that a longer draw zone, which allows the deformation (strain) to be applied over a longer time interval, to be better and less demanding for the molecular network to adjust. The improvement in physical properties is also quite unexpected. One would expect the longer residence time available in a longer draw process to allow the molecular network to relax the strains imposed by the extrusion process and lead to a more randomized (isotropic) orientation typical of stronger films. In both cases the reverse was found, the short-draw led to a complete elimination of draw resonance and to a remarkably strong film.

As mentioned above, another unexpected by-product and advantage of this short-draw technique is that the LLDPE film has tensile properties significantly better than film made by a conventional process. This phenomenon is again not yet understood completely, but greater tensile properties in both the machine direction and cross direction are obtained which far exceed any tensile properties obtained by conventional slot-die extrusion film production processes.

These and other advantages of this invention will be further understood with reference to the drawings, in which:

BRIEF DESCRIPTION OF THE DRAWINGS

FIG. 1 is a perspective diagrammatic view of an apparatus illustrating a technique for drawing a LLDPE film according to this invention, including embossing rolls and a take-up roll.

FIG. 2 is an elevational diagrammatic view illustrating the relative positioning of the slot-die, draw roller and air-knife of the apparatus of FIG. 1.

FIG. 3 is a graph relating tensile strength to linear low density polyethylene content by weight of the extrudate for 1 mil gauge film of 0.935 g/cm$^3$ density where the balance of the film content is low density polyethylene.

FIG. 4 is an elevational diagrammatic view illustrating another technique for drawing and embossing a thermoplastic film according to this invention.

DETAILED DESCRIPTION OF THE INVENTION

It is a primary objective of this invention to substantially eliminate the draw resonance which typically occurs when an extrudate containing linear low density polyethylene, or blends of LLDPE with polyethylene, polypropylene, or copolymers thereof, is drawn to make thermoplastic film at take-up speeds greater than about 40 feet-per-minute. It is a collateral objective of this invention to thereby produce a thermoplastic film which is substantially uniform in gauge thickness within commercial tolerances, and which also exhibits improved tensile properties that are not obtainable through any conventional slot-die extrusion or perhaps even conventional blown tubing film production process. The following detailed description, which is taken in conjunction with the accompanying drawings, is illustrative of the features and advantages of the process and product produced by that process of the present invention.

It will be understood that certain values for the extrudate, conditions of operation of the film producing apparatus, and actual film parameters used herein in the compilation of the described data are each representative of a range over which the instant invention is expected to be effective. For instance, the density of the extrudate containing linear low density polyethylene is not limited to the specific density utilized in the compilation of the following data, since the short-draw technique for elimination of draw resonance is anticipated to be advantageous over the whole range of densities of commercially employed linear low density polyethylene. Likewise, the actual percentage of linear low density polyethylene making up the extrudate is also variable. So too, the gauge thickness of the film produced in accordance with this invention is not limited to any specific value, i.e., the one mil gauge used herein merely is representative of a common gauge of diaper film.

With this in mind, reference is now made to FIGS. 1 and 2 which show in diagrammatic form a system for drawing and embossing thermoplastic film in accordance with the principles of this invention. The drawing and embossing apparatus, are generally indicated at 9. A heated extrudate, or melt, to be described more fully hereafter, is supplied to a slot-die extruder 10 from a suitable source (not shown) and is extruded through an elongate die-slot 11 in the form of a web 12. The web 12 is drawn horizontally through a shortened draw-gap 13 by draw roller D. The draw roller D cooperates with an air-knife 14 to thereby define, in effect, a "draw nip" through which the web 12 is caused to pass. The nip thus formed serves to draw the extruded web 12 into a film 15 of the desired gauge thickness and width. The draw-gap 13 has a substantially constant length X as measured perpendicularly from the die-slot 11 to the draw nip.

The film 15 subsequently passes from the draw roller D to a system of embossing rolls. One of the rolls is a steel roll S having a surface which is embossed, as by conventional engraving methods, with a desired pattern that is to be imparted to the film 15. The other roll in the embossing roll system is a resilient or rubber roll R which presents a resilient surface for co-action with the non-resilient steel roll S when impressing the steel roll pattern into the film 15. The peripheral speed of the rubber and steel rolls is maintained at a speed at or slightly greater than that of the draw roller D in order to effect good release of the film from the draw roller D.

The embossed film proceeds from the embossing roll system to a take-up or wind-up roll T. The take-up roll T can likewise be operated at a peripheral speed commensurate with that of the embossing system and draw roller to prevent any additional stretching of the now embossed film; alternatively, the take-up roller T can be run at a peripheral speed in excess of that of the embossing rolls to thereby stretch the film 15. A chill roller (not shown) may be employed intermediate the embossing roll system and the take-up roll T if it is necessary to cool and set the film after it has passed through the embossing roller system.

In accordance with the discovery of this invention, the draw-gap length X is maintained at not more than about six inches. With the draw-gap 13, thus shortened, an extrudate containing linear low density polyethylene can be drawn into film at take-up speeds well in excess of 40 feet-per-minute, the latter rate representing the approximate rate at which conventional slot-die draw extrusion techniques experience draw resonance in the extrudate. Draw resonance in the LLDPE extrudate is thus eliminated for all practical purposes through the shortening of the draw-gap.

In a preferred technique for producing the film 15 according to this invention, LLDPE forming part of a melt is heated to a temperature in excess of its crystallization temperature which is approximately 230° F., as well as the melting temperature of the extrudate which is typically around 252° F. A melt temperature of about 375° to 450° F. has been advantageously employed. The die 10 and die-slot 11 are maintained at an elevated temperature, generally approaching around 500° F.

The particular linear low density polyethylene resin used herein is commerically sold under the name Dowlex 2037, and has a melt index of 2.5 gms/10 minutes and a density of 0.935 g/cm³. As stated above, the melt may comprise a blend of thermoplastic materials with the linear low density polyethylene, such as a polymer selected from the group of polyethylene, polypropylene and the copolymers thereof. With Dowlex 2037, it has been found advantageous to provide a draw-gap distance X of about 1 inch, with the extrudate being drawn through this distance into a film of approximately 1 mil gauge thickness, which is a typical thickness for diaper-type films. For purposes of subsequent embossing of the film, such as by the embossing rolls R and S, the draw roller D has a surface temperature maintained in the range of about 230°-260° F. The draw roller D is preferably coated with a polytetrafluoroethylene for a better film releasing characteristic. The embossing roll system employs a water cooled rubber roll R, and an embossing steel roll S which has a surface temperature maintained in the range of about 80°-110° F. if no stretching is desired and about 160° F. with stretching.

By using the short-draw extrusion method with the foregoing apparatus set up as described for subsequent embossing of the film, the extrusion data reflective of the draw take-up speed of the draw roller D and the width of the film 15 thus produced were obtained using a melt of 100% linear low density polyethylene drawn into a film of one mil gauge without draw resonance occurring. Draw speeds on the order of about 250 f.p.m. to about 570 f.p.m. were employed and film widths of about 32 to about 40 inches were drawn. A draw rate of several hundred f.p.m. with nominal gauge variations is considered to be a commercially acceptable rate for production of film incorporating linear low density polyethylene.

An unusual and unexpected advantage of the short-draw technique is that the film produced has significantly better tensile properties than equivalent film obtained through processes such as a conventional or longer draw slot-die extrusion. Referring to the graph of FIG. 3, the mechanical properties of one mil gauge diaper-type film made of melts having varying linear low density polyethylene content by weight and produced from the short-draw technique are shown. The graph shown here was compiled using blends of LLDPE and LDPE. The ultimate tensile strengths for the films produced, measured in pounds/square inch, are shown for the machine direction (MD, dotted line), the cross direction (CD, dashed and dotted line) and at 25% elongation in the machine direction, (25% MD, solid line). These ultimate tensile strengths reflect the point at which the film will rupture or break. As shown in this graph, 100% linear low density polyethylene film formed by this technique and having a mean density of 0.935 and 1 mil gauge has an ultimate tensile strength in the machine direction of about 6#/in width in the machine direction, 4.4#/in width in the cross direction, and 2.4#/in width at 25% elongation in the machine direction. These tensile measurements as shown in the graph and in the following table were obtained with a 1 inch width of a strip of film. In general, the advantageous results achieved by this process are particularly evident in extrudate blends containing at least 30% LLDPE by weight.

Referring to the following table, the tensile properties for the short-drawn film of this invention formed at high take-up speeds are compared to conventional slot-die extruded film made from an identical LLDPE extrudate of 1 mil gauge where a low take-up speed of 30 feet/min and a conventional gap of about 9 inches were employed.

| Ultimate Tensile Strengths | Conventional Slot-Die Extrusion (#/in width) | Invention (#/in width) |
| --- | --- | --- |
| MD | 3.9 | 6 |
| CD | 3.5 | 4.4 |

As shown, tensile strengths in the slot-die short-drawn film of the invention are significantly and unexpectedly beter in both machine direction (MD) and cross direction (CD) than those obtainable with the conventional slot-die technique. Furthermore, whereas the strength in the MD for the conventional is 11% greater than the CD, there is a 36% greater strength in the MD of the LLDPE film of the invention.

It will be further noted that film produced by the short-draw technique of this invention also exhibits improved tensile properties over blown film made from an identical extrudate. The film produced by the short-draw technique is thus superior in tensile qualities over conventionally cast film and blown film formed from an identical extrudate.

The above description of the short-draw technique for production of a thermoplastic film embodying the principles of this invention is by way of illustration and not limitation. It will be obvious that there are other equivalent forms of the invention which employ the advantageous properties and results achieved by this invention without departing from the spirit and scope thereof. For example, with reference to FIG. 4, an alternative embodiment is shown for forming a thermoplastic film according to this invention with subsequent embossing. In this second embodiment, the draw roller D described in relation to the previously discussed embodiment has been removed from the apparatus. The steel embossing roller S here functions to both draw the extrudate from the slot-die 10 through a nip made with the air-knife 14, and to thereupon emboss the film 15 thereby formed by impressing a pattern thereon in co-operation with rubber roll R. Take-up roll T subsequently winds up the embossed film 15. Other variations will be also understood to a person of skill in this art.

What is claimed is:

1. A length of thermoplastic film produced by the steps of:

continuously extruding an extrudate comprising linear low density polyethylene having a propensity for draw resonance at high draw speeds when passed through a slot-die in the form of a web, with the extrudate at a temperature above its crystallization temperature, locating a draw roller for the web adjacent the slot of the die to thereby produce a short draw-gap of not more than about six inches, drawing the web into a film having commercially uniform gauge thickness with the draw roller at take-up speeds of at least about several hundred f.p.m., and maintaining the short draw-gap at said speeds whereby said film is continuously formed and draw resonance is substantially eliminated in the web.

2. The thermoplastic film of claim 1 wherein the extrudate is comprised of at least about 30% linear low density polyethylene by weight.

3. The thermoplastic film of claim 1 wherein the extrudate further comprises a polymer selected from the group of polyethylene, polypropylene and the copolymers thereof.

4. A length of thermoplastic film, the thermoplastic film comprised of linear low density polyethylene having a tendency for draw resonance when drawn from a slot-die into a film at high speed, produced by the steps of heating a melt containing linear low density polyethylene to a temperature greater than the crystallization temperature of the linear low density polyethylene, continuously extruding the melt through a slot-die in the form of a web, drawing the web from the slot-die through a nip defined in part by a draw roller whereby the web is drawn into a film, a short draw-gap over which the web is drawn between the nip and the slot of the die being not more than about six inches, and continuously driving the draw roller so as to produce film of a commercially uniform gauge thickness at a rate of at least about several hundred f.p.m., whereby the short draw-gap between the slot-die and the nip substantially eliminates draw resonance in the web.

5. The thermoplastic film of claim 4 wherein linear low density polyethylene comprises at least about 30% by weight of the extrudate.

6. The thermoplastic film of claim 5 wherein the film produced has a gauge thickness of approximately 1 mil.

* * * * *